B. E. ELDRED.
CHEMICAL APPARATUS.
APPLICATION FILED JAN. 7, 1908. RENEWED MAY 9, 1912.
1,043,581.
Patented Nov. 5, 1912.
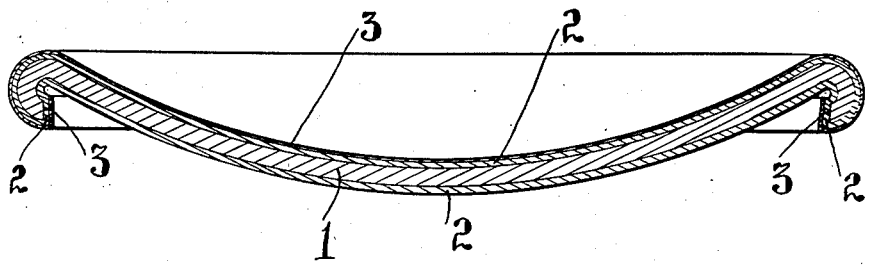
Attest:
by
Inventor:
Byron E. Eldred
Attys

UNITED STATES PATENT OFFICE.

BYRON E. ELDRED, OF BRONXVILLE, NEW YORK, ASSIGNOR TO THE COMMERCIAL-RESEARCH COMPANY, OF NEW YORK, N. Y., A CORPORATION OF NEW YORK.

CHEMICAL APPARATUS.

1,043,581.      Specification of Letters Patent.      Patented Nov. 5, 1912.

Application filed January 7, 1908, Serial No. 409,623. Renewed May 9, 1912. Serial No. 696,280.

*To all whom it may concern:*

Be it known that I, BYRON E. ELDRED, a citizen of the United States, residing at Bronxville, in the county of Westchester and State of New York, have invented certain new and useful Chemical Apparatus; and I do hereby declare the following to be a full, clear, and exact description of the same, such as will enable others skilled in the art to which it appertains to make and use the same.

This invention relates to chemical apparatus and consists in an evaporating pan or still lined with a noble metal in the form of an impervious, poreless film and having a body of a strong and stiff ferrous metal to which said film lining is attached in heat conducting relationship by a strong and indissoluble union in the nature of a weld union; all as more fully hereinafter set forth and as claimed.

For many purposes, as in evaporating and distilling such corrosive substances as sulfuric acid it is desirable to have relatively large vessels made of the resistant noble metals like gold and platinum. Both gold and platinum however are relatively weak, soft metals and aside from the question of their cost, it is impracticable to make very large vessels of either. Platinum further suffers from the disadvantage that it is attacked more or less by reducing and smoky flames, particularly if in contact with silicious material or dust, rendering fire heating of platinum pans disadvantageous.

It is the purpose of the present invention to provide vessels which shall be merely lined with the expensive resistant noble metal and shall have a strong backing layer for such lining, weld-united thereto and thoroughly supporting the same; such backing layer comprising a ferrous metal such as iron or steel. There is of course no difficulty in making vessels of sufficient strength in any size from steel or iron, and the same is true of gold or platinum filmed iron or steel. Preferably, further, this backing layer of ferrous material is provided with a layer of another and heat conductive metal on the exterior where the vessel is to be used with fire heat.

For concentrating sulfuric acid, a useful form of pan or still under the present invention may be produced from sheet steel or iron lined on one side with a welded-on film-like layer of gold or platinum and on the other with a thicker layer of copper, similarly welded on. Sulfuric acid is a difficult liquid to heat, its convection being slow so that it does not rapidly take up heat from heated surfaces or heat uniformly. Platinum being a relatively poor conductor of heat in a platinum pan it is difficult to heat a mass of sulfuric acid uniformly, a spot of extra heat on the bottom of such a pan not tending to equalize laterally or to be dissipated by the convection of the acid. In using such platinum pans it is therefore necessary to adopt means of providing a very uniform heating and direct, localized impingement of a flame, aside from the danger of injuring the platinum, will not do. In the composite pan of the present invention however, the thicker mass of the iron or steel will serve to equalize heat laterally even if the heating of the bottom of the pan be unequal while by having the platinum layer comparatively thin and thoroughly welded to the steel at all abutting surfaces, so as to insure good metallic contact, all portions of such platinum layer will be maintained at an equalized heat. Impingement of flame on a steel surface is not so dangerous as impingement upon a platinum surface. In the preferred form of the present invention stated, however, the steel is covered on the under side by a welded-on layer of copper and this layer is at once better adapted for flame impingement than iron and is a better conductor for heat; *i. e.*, operates even better in producing a lateral equalization of temperature.

Steel having welded-on coatings of copper of any thickness desired may now be produced under the process patented to J. F. Monnot (Patent No. 853,716) and such material may well be used to produce the present article. The copper coating in billets made by the stated process is indissolubly united to the steel by a union resisting discovery by cutting tools, such as cold chisels, by violent changes of temperature, such as heating and quenching, or by flexion. The joined metals are to all intents and purposes, or are actually, welded together, and are of course in perfect metallic heat transmitting relationship. Bars of such Monnot metal having copper or silver on both sides may be heated until the coating metal is somewhat softened and may then be contacted with bodies of gold or platinum under pressure until union is effected, where-upon the new billet may then be rolled out into sheets and shaped to form the articles of the present invention, the side of the sheet carrying the noble metal being of course used for the inside of the chemical vessel. Instead of using solid bodies of gold or platinum, these metals may be applied to the copper or silver in a molten state, this having the advantage of forming absolutely poreless coatings. Fluid gold or platinum may be applied to the clean naked steel, the gold being preferably heated much above its melting point, or fluid iron may be contacted with the noble metal in a solid state. But gold or platinum united to Monnot metal carrying copper or silver coatings gives an article satisfactory for the present purposes.

However shaped, the chemical vessel under the present invention preferably has the noble metal lining extended over its mouth or opening in such manner as to prevent liquids gaining access capillarily to the more corrosible exterior metal, but in no case should the noble metal extend sufficiently far to contact with settings or supports, or, in the case of a platinum layer, should it come where impinging flame may contact with it.

Sulfuric acid pans for concentrating acid may advantageously be constructed with overhanging edges having the noble metal covering such edges.

In the accompanying drawing I show an evaporating pan constructed as above described, the figure showing a vertical section thereof.

In said drawing, 1 designates the base of strong metal, such as iron or steel, 2, 2, coatings of another metal, such as copper or silver, weld-united to the metal 1, and 3 a layer of metal, such as gold or platinum, which is relatively unaffected by chemicals, weld-united to the metal 2. As shown, the metals 2 and 3 are drawn over the edges of the metal 1, to avoid chemical attack thereon.

It is obvious that various other chemical receptacles and other chemical apparatus may be constructed of the same weld-united layers of strong metal and chemically-inactive metal.

What I claim is:—

1. A chemical vessel adapted for the evaporation of corrosive liquids and having an impervious lining of a noble metal and a thicker strengthening body of a ferrous metal, the two metals being metallically united and in heat-conducting relationship at all points and said vessel having an exterior wall adapted to receive heat and free from said noble metal.

2. A chemical vessel adapted for the evaporation of corrosive liquids and having an impervious lining of a noble metal, a thicker strengthening body of a ferrous metal, and an exterior layer of a metal conducting heat freely, the several layers being metallically united and in heat conducting relationship at all points.

3. A chemical vessel adapted for the evaporation of corrosive liquids and having an impervious lining of a noble metal united to a strengthening body of ferrous metal by a linking layer of another metal, said metals being metallically united and in heat conducting relationship at all points and said vessel having an exterior wall adapted to receive heat and free from said noble metal.

4. A chemical vessel adapted for the evaporation of corrosive liquids and having an impervious lining of noble metal united to a strengthening body of ferrous metal by a linking layer of another metal, said ferrous metal body on its exterior surface being provided with a cohering layer of a metal conducting heat freely, the several layers being metallically united and in heat conducting relationship at all points.

5. An evaporating pan having a body of ferrous metal and an impervious lining layer of noble metal metallically united thereto and in uniform heat conducting relationship therewith, said lining layer extending over the edge of the vessel only.

6. An evaporating pan having a body of ferrous metal and an impervious lining layer of noble metal metallically united thereto and in uniform heat conducting relationship therewith, said pan having an overhanging edge forming a reëntrant angle and said lining extending over the edge and terminating in said reëntrant angle.

7. An evaporating pan having a body of ferrous metal and an impervious lining layer of noble metal metallically united thereto and in uniform heat conducting relationship therewith, said pan having an overhanging edge forming a reëntrant angle and said lining extending over the edge and terminating in said reëntrant angle, said body of ferrous metal being provided also on the under side of the pan with a metallically united layer of a relatively better heat-conducting metal.

8. An evaporating pan having body of ferrous metal, a lining of gold metallically united thereto, and a layer of copper weld-united to the under side of said ferrous metal body.

In testimony whereof I affix my signature, in the presence of two witnesses.

BYRON E. ELDRED.

Witnesses:
J. F. MONNOT,
H. M. MARBLE.